United States Patent
Nagghappan et al.

(10) Patent No.: US 10,723,643 B2
(45) Date of Patent: *Jul. 28, 2020

(54) METHOD OF RECOVERING OIL OR GAS AND TREATING THE RESULTING PRODUCED WATER

(71) Applicant: Veolia Water Solutions & Technologies Support, Saint-Maurice (FR)

(72) Inventors: Lnsp Nagghappan, Irvine, CA (US); John A. Korpiel, Wexford, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,465

(22) Filed: Jul. 11, 2018

(65) Prior Publication Data
US 2018/0319690 A1 Nov. 8, 2018

Related U.S. Application Data

(63) Continuation of application No. 13/443,971, filed on Apr. 11, 2012, now Pat. No. 10,023,487, which is a
(Continued)

(51) Int. Cl.
*C02F 9/00* (2006.01)
*C02F 1/40* (2006.01)
(Continued)

(52) U.S. Cl.
CPC ............... *C02F 9/00* (2013.01); *C02F 1/40* (2013.01); *C02F 1/68* (2013.01); *E21B 43/34* (2013.01);
(Continued)

(58) Field of Classification Search
CPC ...... C02F 9/00; C02F 1/40; C02F 1/68; C02F 2101/32; C02F 1/722; C02F 1/32;
(Continued)

(56) References Cited

U.S. PATENT DOCUMENTS

2007/0051513 A1* 3/2007 Heins .................. E21B 43/24
166/265
2007/0090039 A1* 4/2007 Young .................... B01D 61/04
210/321.6
(Continued)

OTHER PUBLICATIONS

Jesse Garcia, "Final Report Beneficial Reuse Of San Ardo Produced Water", Oct. 2006.*

*Primary Examiner* — Krishnan S Menon
*Assistant Examiner* — Waqaas Ali
(74) *Attorney, Agent, or Firm* — Coats & Bennett PLLC

(57) ABSTRACT

A method or process for treating wastewater containing high organics, silica, boron, hardness, and suspended and dissolved solids. The method includes degasifying the wastewater for the removal of dissolved gases and thereafter chemically softening the wastewater. After the chemical softening step, the wastewater is directed through a media filter or membrane which removes additional solids and precipitants. Thereafter the wastewater is directed through a sodium ion exchange that further softens the wastewater. The effluent from the ion exchange is directed through a cartridge filter and the effluent from the cartridge filter is directed through one or more reverse osmosis units. At a selected phase of the process, prior to the wastewater reaching the reverse osmosis unit or units, the pH of the wastewater is raised and maintained such that the pH of the wastewater reaching a reverse osmosis unit is at a pH greater than 10.5.

14 Claims, 11 Drawing Sheets

Related U.S. Application Data continuation-in-part of application No. 12/904,286, filed on Oct. 14, 2010, now Pat. No. 9,067,801, which is a continuation of application No. 11/609,659, filed on Dec. 12, 2006, now Pat. No. 7,815,804.

(60) Provisional application No. 61/474,517, filed on Apr. 12, 2011.

(51) Int. Cl.

| | |
|---|---|
| *C02F 1/68* | (2006.01) |
| *E21B 43/34* | (2006.01) |
| *C02F 103/36* | (2006.01) |
| *C02F 103/10* | (2006.01) |
| *C02F 1/42* | (2006.01) |
| *C02F 1/56* | (2006.01) |
| *C02F 1/20* | (2006.01) |
| *C02F 1/52* | (2006.01) |
| *C02F 1/66* | (2006.01) |
| *C02F 1/44* | (2006.01) |
| *C02F 5/06* | (2006.01) |
| *C02F 1/24* | (2006.01) |
| *C02F 1/32* | (2006.01) |
| *C02F 1/72* | (2006.01) |
| *C02F 101/32* | (2006.01) |

(52) U.S. Cl.
CPC ............... *C02F 1/20* (2013.01); *C02F 1/24* (2013.01); *C02F 1/32* (2013.01); *C02F 1/42* (2013.01); *C02F 1/441* (2013.01); *C02F 1/444* (2013.01); *C02F 1/5236* (2013.01); *C02F 1/5245* (2013.01); *C02F 1/56* (2013.01); *C02F 1/66* (2013.01); *C02F 1/722* (2013.01); *C02F 5/06* (2013.01); *C02F 2001/5218* (2013.01); *C02F 2101/32* (2013.01); *C02F 2103/10* (2013.01); *C02F 2103/365* (2013.01); *C02F 2209/06* (2013.01); *C02F 2303/18* (2013.01)

(58) Field of Classification Search
CPC ...... C02F 2303/18; C02F 1/5245; C02F 1/24; C02F 1/5236; C02F 1/441; C02F 5/06; C02F 1/444; C02F 1/66; C02F 2001/5218; C02F 1/20; C02F 1/56; C02F 1/42; C02F 2209/06; C02F 2103/10; C02F 2103/365; E21B 43/34

See application file for complete search history.

(56) References Cited

U.S. PATENT DOCUMENTS

| | | | |
|---|---|---|---|
| 2008/0135478 A1* | 6/2008 | Zuback | C02F 9/00 210/638 |
| 2011/0005751 A1* | 1/2011 | Audibert-Hayet | E21B 43/24 166/272.4 |
| 2014/0014584 A1* | 1/2014 | Cone | C02F 9/00 210/652 |

* cited by examiner

METHOD OF RECOVERING OIL OR GAS AND TREATING THE RESULTING PRODUCED WATER

CROSS REFERENCE TO RELATED APPLICATION

The present application is a continuation of U.S. patent application Ser. No. 13/443,971 filed Apr. 11, 2012, which is a continuation-in-part of U.S. patent application Ser. No. 12/904,286 filed Oct. 14, 2010, which is a continuation of U.S. patent application Ser. No. 14/609,659, which matured into U.S. Pat. No. 7,815,804, and claims priority to provisional U.S. Patent Application Ser. No. 61/474,517 filed Apr. 12, 2011. Each of these references are expressly incorporated herein by reference.

BACKGROUND OF THE INVENTION

Numerous types of wastewater or produced water have relatively high concentrations of organics, silica, boron, hardness, suspended and dissolved solids. For example, oil recovery operations produce water that includes high concentrations of these contaminants. If such wastewater or produced water is to be discharged or used in high purity applications, such as a feed to a boiler or once through a steam generator or process water, then there must be a substantial reduction in silica, total hardness, dissolved solids and organics.

Ion exchange processes and reverse osmosis processes have been used for desalting produced water or wastewater. Some practices involving the operation of reverse osmosis systems usually maintain a neutral pH condition, which is a pH of approximately 6-8. In the case of feed water produced by oil and gas operations, the recovery across reverse osmosis systems is often limited by scaling due to silica or fouling due to organics. That is, high concentrations of silica in the feed water tend to scale the reverse osmosis membranes due to the concentration of silica exceeding solubility limits. Organics that exceed solubility limits also tend to foul the reverse osmosis membranes. Scaling due to silica and fouling due to organics can cause substantial down time of the reverse osmosis unit or units, requiring frequent cleaning, replacement and maintenance. The maintenance is obviously expensive and the down time is costly and inefficient.

In addition, in the case of produced water, for example, processes are designed to remove silica and boron. These contaminants are often present in the form of weakly ionized salts, sicilic acid and boric acid, and generally reverse osmosis membranes are not efficient in rejecting such weakly ionized salts.

Therefore, there has been and continues to be a need for an economical process for treating wastewater or produced water that reduces fouling due to organics, reduces scaling due to silica, and which will efficiently reduce the concentrations of silica, organics, dissolved solids and hardness in the wastewater or produced water.

SUMMARY OF THE INVENTION

The present invention relates to a method for treating a waste stream or produced water derived from an oil or gas recovery operation. Produced water contains organics, silica, hardness, dissolved solids, and suspended solids. Hardness in the produced water is reduced by chemically softening the produced water. During the softening process, the pH of the wastewater is raised to above 10.5. The wastewater is then directed to a mixing tank where it is vigorously mixed to cause the formation of crystals therein. Free oil, emulsified oil in some cases, and the crystals are removed from the wastewater with a filtration membrane. At least a portion of the reject stream produced by the filtration membrane is recirculated to the mixing tank. The membrane effluent is directed to an ion exchange unit where residual calcium and magnesium hardness is removed therefrom. The effluent from the ion exchange unit is directed to at least one reverse osmosis unit where dissolved solids, organics and boron are removed therefrom.

Other embodiments of the invention include treating the reverse osmosis membrane effluent in an ammonia polisher and/or an oxidation system.

Additional embodiments of the invention include pretreating the produced water in a degasification system or a gas flotation system.

Other objects and advantages of the present invention will become apparent and obvious from a study of the following description and the accompanying drawings which are merely illustrative of such invention.

DESCRIPTION OF THE INVENTION

The present invention relates to a wastewater treatment process for treating wastewater or produced water that typically contains organics, silica, boron, dissolved solids and suspended solids. Various types wastewater may contain these contaminants. For example, in the petroleum industry, produced water typically includes these contaminants. As used herein, the term "produced water" means water that is produced along with oil or gas in an oil or gas recovery process. Typically, the oil or gas is separated from the water and the separated water is referred to as produced water which is one type of wastewater. The present invention presents a process that can be utilized to treat various types and forms of wastewaters including, but not limited to, produced water and cooling tower blowdown.

As described subsequently herein, the process of the present invention entails chemically softening the wastewater in a process that removes hardness. Thereafter the wastewater is subjected to membrane filtration and ion exchange softening. The wastewater is then directed through one or more reverse osmosis units. To prevent scaling and fouling of the membranes in the reverse osmosis units, an antiscalant is mixed with the wastewater upstream from the reverse osmosis units and the pH of the wastewater is preferably maintained above 10.5. The wastewater can be further treated in an ammonia polisher and an oxidation system. Further, the wastewater can be directed through a heat exchanger so that the temperature of the wastewater is cooled prior to treatment in the reverse osmosis unit(s). Depending on the quality of the wastewater prior to chemical softening, the wastewater may be pretreated in a degasification system or a gas flotation system.

Figure 1:
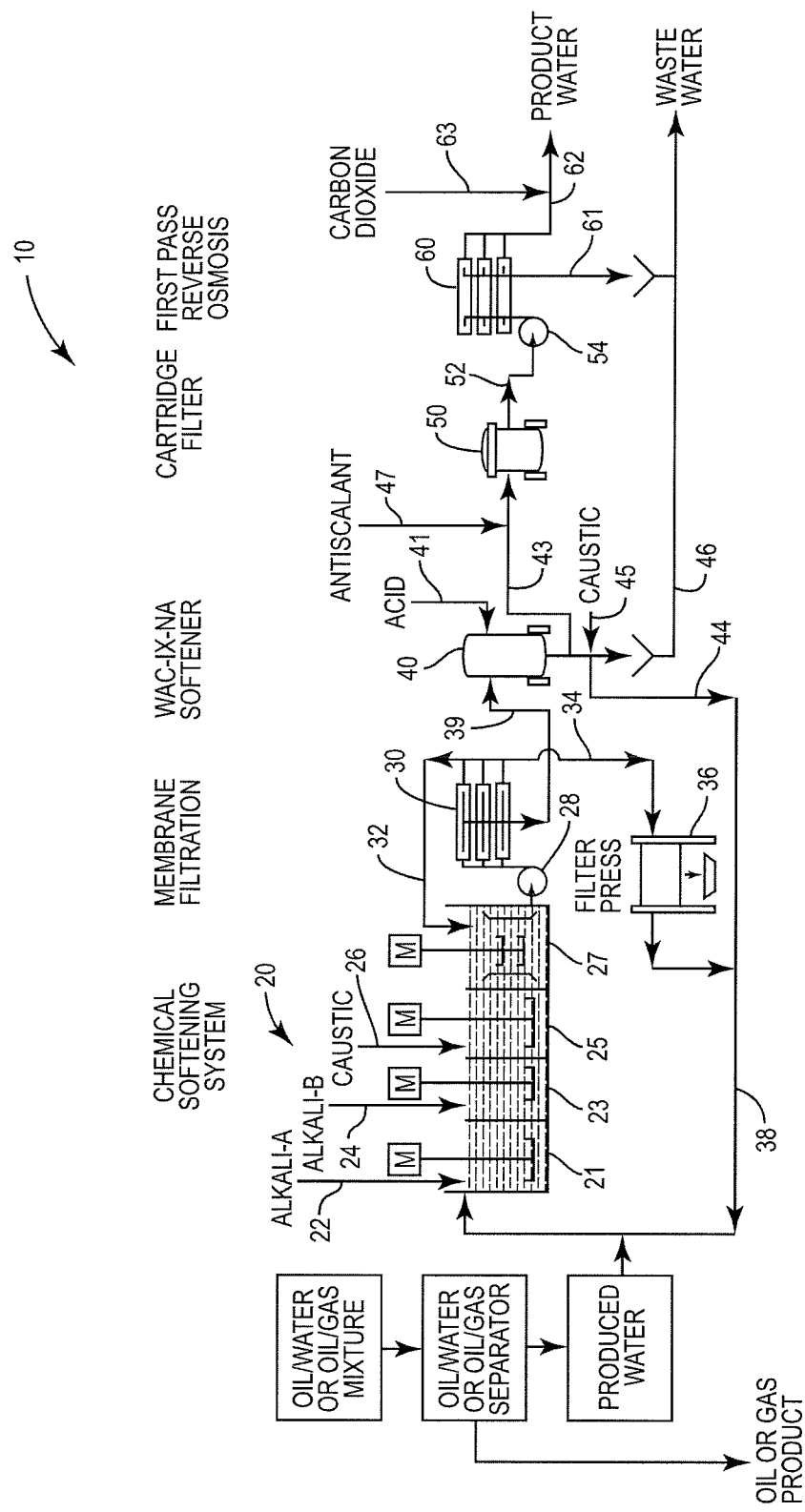
FIG. 1 is a schematic illustration of the process of the present invention.

In FIG. 1, the wastewater treatment system of the present invention is indicated generally by the numeral 10. The system includes a chemical softening unit 20, a membrane filter 30, an ion exchange filtration unit 40, a cartridge filter 50, and at least one reverse osmosis unit 60.

Chemical softening unit 20 includes a series of reactors 21, 23, 25 disposed sequentially in relation to one another. Each of the reactors 21, 23, and 25 includes a mixer and inlets 22, 24, and 26 respectively. As discussed in more detail herein, Inlets 22, 24, and 26 are used to inject chemicals such as softening reagents into the water held in reactors 21, 23, and 25. Downstream from the reactors 21, 23, 25 is disposed reactor 27 which includes a vertical tube mixer or crystallization tank. A pump 28 is operative to pump wastewater from reactor 27 to the downstream membrane filter 30.

In one embodiment the membrane filter 30 is a ceramic ultrafiltration membrane and is used to remove suspended solids and precipitants in the water passing through the membrane. Typically, ceramic membranes reject particles having a size of 0.2 μm or larger. However, ceramic membranes can be designed such that they reject particle sizes as low as 0.03 μm. Subsequently, herein is a general discussion on ceramic membranes and their applicability to treating feed water streams having one or more of the contaminants discussed here. In another embodiment, the membrane filter 30 is a polymeric membrane. Ceramic membranes are desirable when dealing with water having a very high temperature. For example, ceramic membranes are desirable when the water passing therethrough has a temperature approaching 300° F.

As will be appreciated from subsequent portions of this disclosure, a reject recycle line 32 that extends from the membrane filter 30 to the reactor 27. In addition, there is provided a reject waste line 34 that extends from the membrane filter 30 to a filter press 36. Wastewater produced by the filter press 36 is directed through line 38 back to the chemical softening system 20. Membrane filter 30 produces a permeate or effluent that is directed from the membrane filter 30 via line 39 which extends to an ion exchange unit 40. Further, the membrane filter produces a reject stream, a portion of which is recycled via line 32 back to the mixing reactor 27.

Ion exchange unit 40 includes a chemical inlet 41 for regeneration of the ion exchange resin upon exhaustion. A recycle line 44 is operatively connected between the ion exchange unit 40 and the chemical softening unit 20. Ion exchange unit 40 is also operatively connected to a waste line 46 that directs waste produced in the ion exchange unit 40 to disposal. A caustic inlet 45 is disposed downstream from the ion exchange unit 40 and is used to inject a caustic solution into the waste stream produced by the ion exchange unit 40. Ion exchange unit 40 also includes a treated effluent line 43 that extends from the ion exchange unit 40 to a cartridge filter 50. As will be discussed subsequently, the ion exchange unit 40 is utilized to remove residual hardness from the wastewater and, in the case of the embodiment disclosed herein, the ion exchange unit 40 is operated in the sodium mode.

Cartridge filter 50 further filters the water which exits the cartridge filter 50 through filtered water line 52. An antiscalant inlet 47 is disposed upstream of the cartridge filter 50, as shown in FIG. 1, which injects an antiscalant reagent into the water in line 43. Addition of the antiscalant reagent provides a soluble chemical equilibrium for scale forming compounds across the downstream reverse osmosis unit 60. In another embodiment however, the antiscalant inlet can be disposed downstream of the cartridge filter 50 and upstream from the reverse osmosis unit 60. A pump 54 is operatively interconnected between cartridge filter 50 and reverse osmosis unit 60. A line 52 directs the effluent from the cartridge filter 50 to the inlet of the reverse osmosis unit 60.

A reject line 61 extends from the reverse osmosis unit 60 and is operatively connected to the waste line 46 which directs waste produced in the reverse osmosis unit 60 to disposal. Treated effluent line 62 extends from the reverse osmosis unit 60 to a discharge area or to a point where the treated water is subjected to additional treatment. A carbon dioxide inlet 63 is disposed downstream from the reverse osmosis unit 60 and is used to inject carbon dioxide into the treated effluent. It is appreciated that the reverse osmosis unit 60 produces a reject stream that is directed into line 61 and a permeate stream that is directed into line 62. In this embodiment and in all subsequent embodiments, the treated effluent can be utilized as a water source for a steam generation device such as a boiler or a once through steam generator. In one example, the treated effluent is used to generate steam which is injected into an oil and/or gas bearing formation in order to extract oil and/or gas therefrom.

As stated above, the wastewater treatment system 10 of the present invention can be used to treat various types and forms of influent wastewater streams such as a produced water stream or a cooling tower blowdown stream. FIG. 1 illustrates the present invention being utilized to treat a produced water stream. In this case, an oil/water mixture or a gas/water mixture is pumped up through an oil or gas-gathering well and the mixture is sent to a separator which, in the case of an oil/water mixture, separates the oil from the water to yield an oil product and separated water which is termed produced water. The produced water becomes the feed stream that is directed into the wastewater treatment system 10. In the case of a gas/water mixture, the separator separates the gas from the water to form a gas product and produced water. The produced water becomes the feed stream to the wastewater treatment system 10.

While FIG. 1 discloses one basic embodiment of the wastewater treatment system, it should be appreciated that any of the embodiments for the wastewater treatment system 10 shown in FIGS. 1-7 could be utilized for treating produced water, cooling tower blowdown, or other waste streams.

Figure 2:
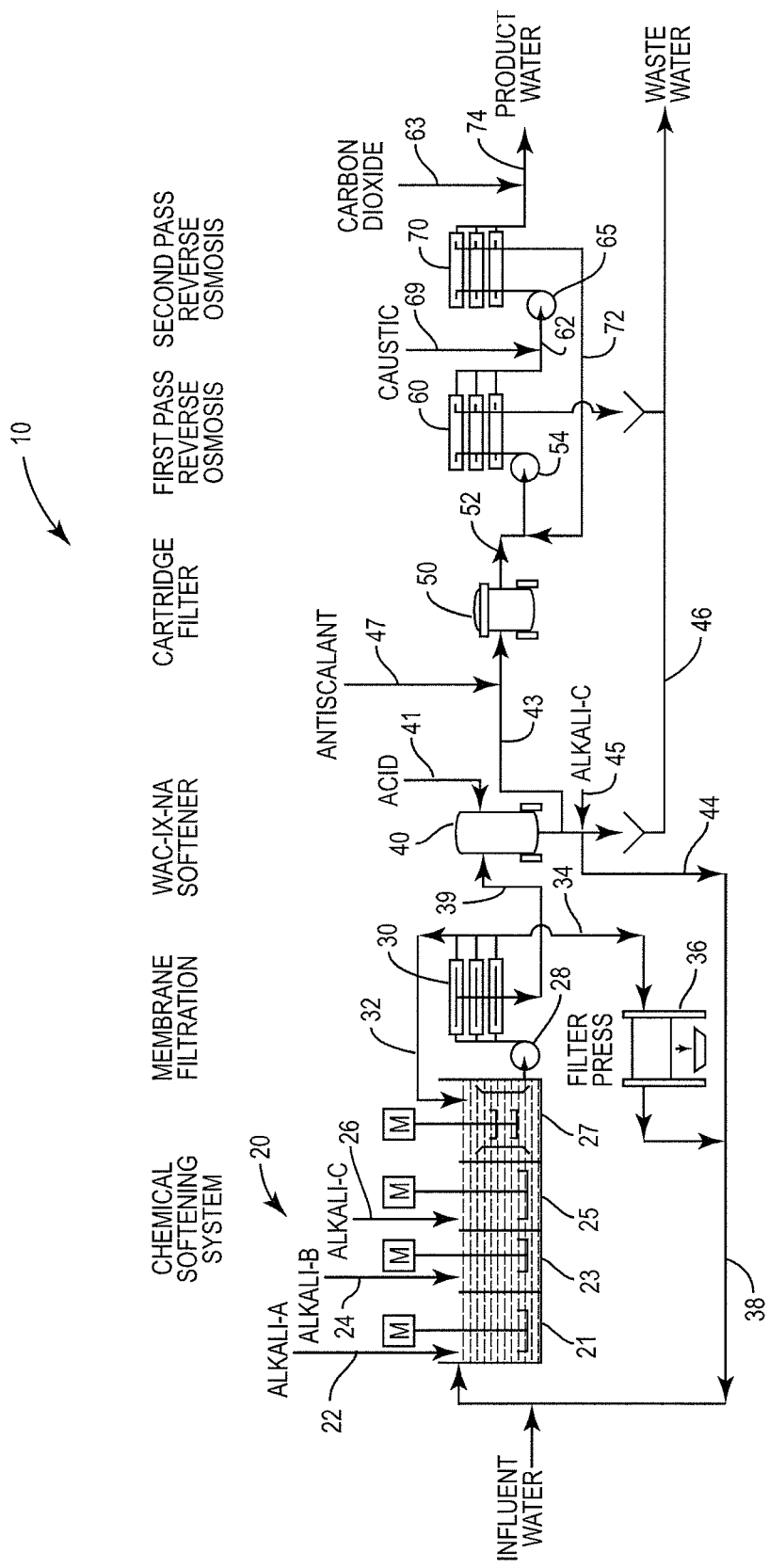
FIG. 2 is a schematic illustration of the process of the present invention including a double pass reverse osmosis system.

With reference to FIG. 2, the wastewater treatment system 10 can further include a second reverse osmosis unit 70. This embodiment is generally referred to as a double pass reverse osmosis system because the filtered water from the cartridge filter 50 is treated in two sequential reverse osmosis units 60, 70. A caustic inlet 64 is disposed downstream from the first reverse osmosis unit 60 and upstream from the second reverse osmosis unit. Caustic inlet 64 is used to inject a caustic solution into the treated effluent in line 62. A pump 65 is operatively connected between the first reverse osmosis unit 60 and the second reverse osmosis unit 70. Permeate produced by the first reverse osmosis unit 60 is pumped from the first reverse osmosis unit 60 to the second reverse osmosis unit 70 by pump 65.

Second reverse osmosis unit 70 produces a permeate stream and a reject stream. The reject stream is directed into line 72 and recycled to a point upstream of the first reverse osmosis unit 60. The permeate produced by the second reverse osmosis unit 70 is directed into line 74. In this embodiment, a carbon dioxide inlet 63 is disposed downstream of the reverse osmosis unit 70 and is used to inject carbon dioxide into the permeate passing through line 74.

Figure 3:
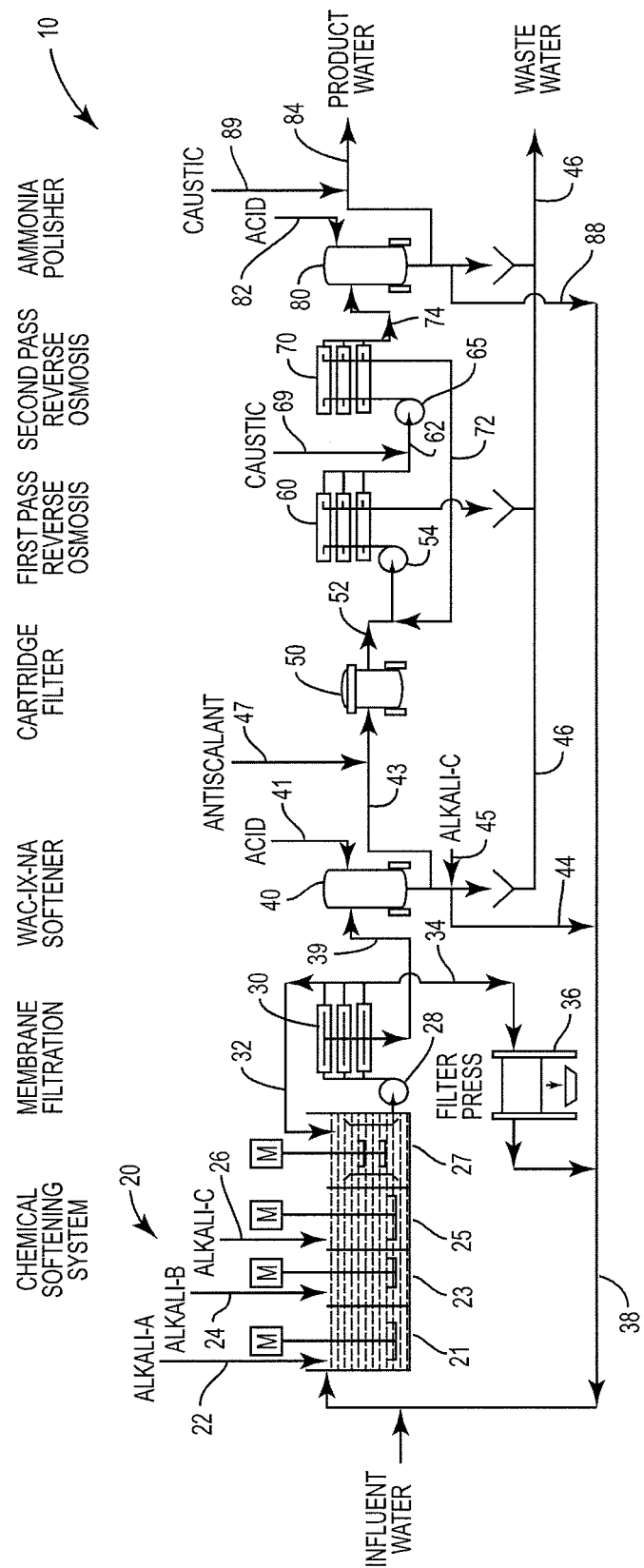
FIG. 3 is a schematic illustration of the process of the present invention including an ammonia polisher.

FIG. 3 illustrates an embodiment of the wastewater treatment system 10 having the chemical softening unit 20, membrane filter 30, ion exchange unit 40, first and second reverse osmosis units 60, 70 and an ammonia polisher 80. In this embodiment, the treated effluent line 74 extends from the second reverse osmosis unit 70 to the ammonia polisher 80. Ammonia polisher 80 includes a chemical inlet line 82 for regeneration of the ion exchange resin upon exhaustion and a recycle line 88 that is operative to recycle waste from the ammonia polisher 80 to the chemical softening unit 20. Ammonia polisher 80 is also operatively connected to the waste line 46 that directs waste produced in the ammonia polisher 80 to disposal. Ammonia polisher 80 further includes a treated effluent line 84 that extends from the ammonia polisher 80 to a discharge area or to a point where the treated water is subjected to additional treatment. A caustic inlet 89 is disposed downstream from the ammonia polisher 80 and injects a caustic solution into the treated effluent in line 84.

Figure 4A:
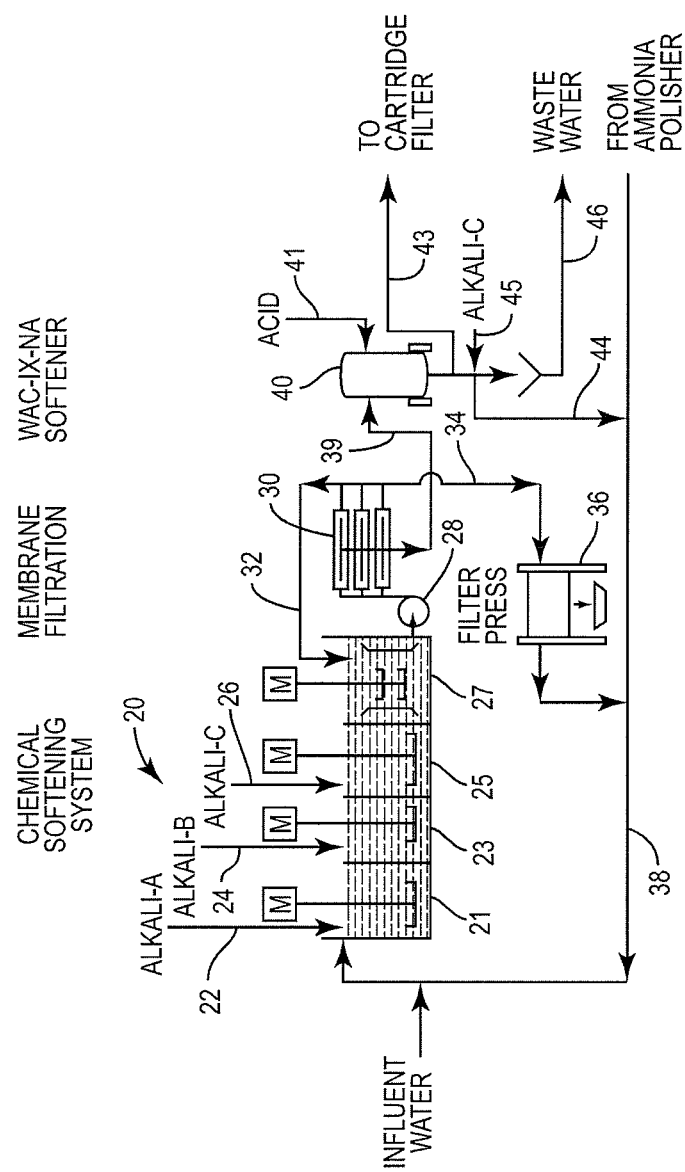
FIGS. 4A-4B are schematic illustrations of the process of the present invention including an oxidation system.
Figure 4B:
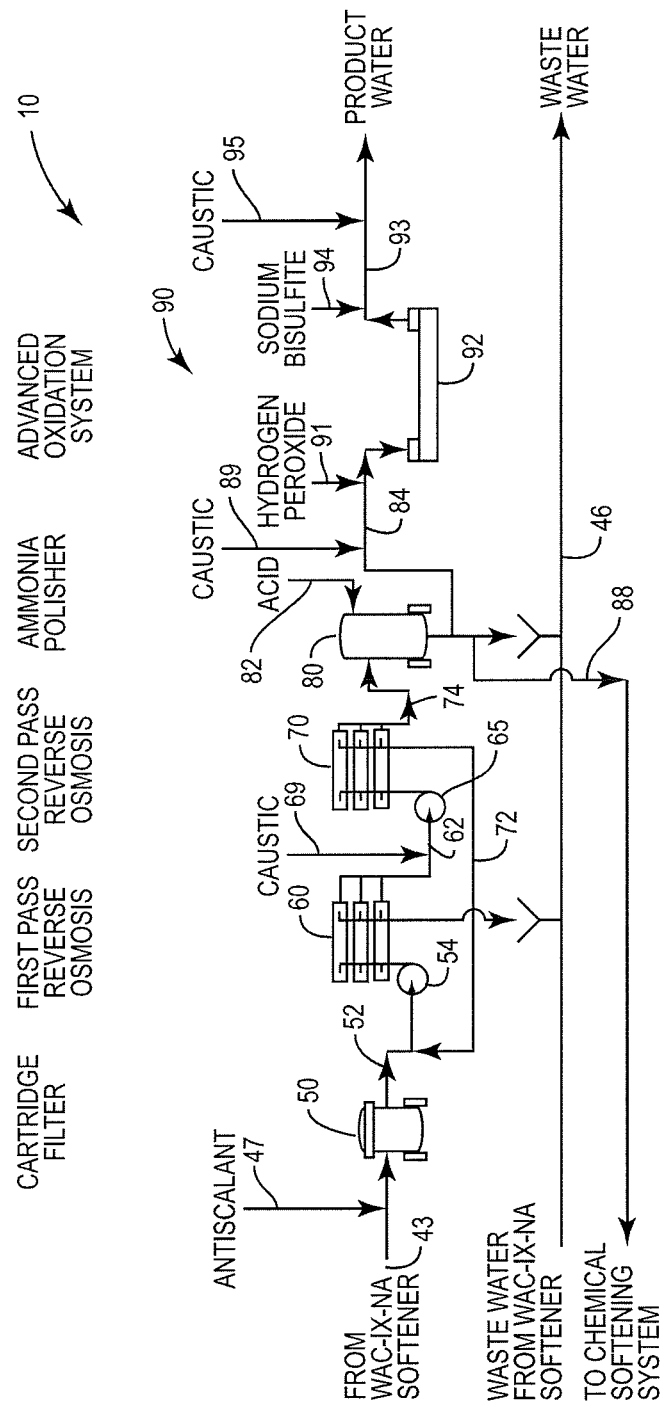

FIGS. 4A-4B illustrate an embodiment of the wastewater treatment system 10 having the chemical softening unit 20, membrane filter 30, ion exchange unit 40, first and second reverse osmosis units 60, 70, ammonia polisher 80, and an oxidation system 90. FIG. 4A illustrates the chemical softening unit 20, membrane filter 30, and ion exchange unit 40, as described above in FIG. 1. FIG. 4B illustrates the cartridge filter 50, first and second reverse osmosis units 60, 70, and the ammonia polisher 80 as described above in FIGS. 2 and 3B. FIG. 4B also includes the oxidation system 90. In this embodiment, the treated effluent line 84 extends from the ammonia polisher 80 to an ultraviolet light unit 92 in the oxidation system 90. Oxidation system 90 includes a hydrogen peroxide ($H_2O_2$) inlet 91 that injects a $H_2O_2$ solution into the treated effluent in line 84 upstream from the ultraviolet light unit 92. Oxidation system 90 further includes an irradiated treated effluent line 93 that extends from the ultraviolet light unit 92 to a discharge area or to a point where the treated water is subjected to additional treatment. A sodium bisulfite ($NaHSO_3$) inlet 94 and a caustic inlet 95 are disposed downstream from the ultraviolet light unit 92 and inject $NaHSO_4$ and a caustic solution, respectively, into the irradiated treated effluent in line 93.

Figure 5A:
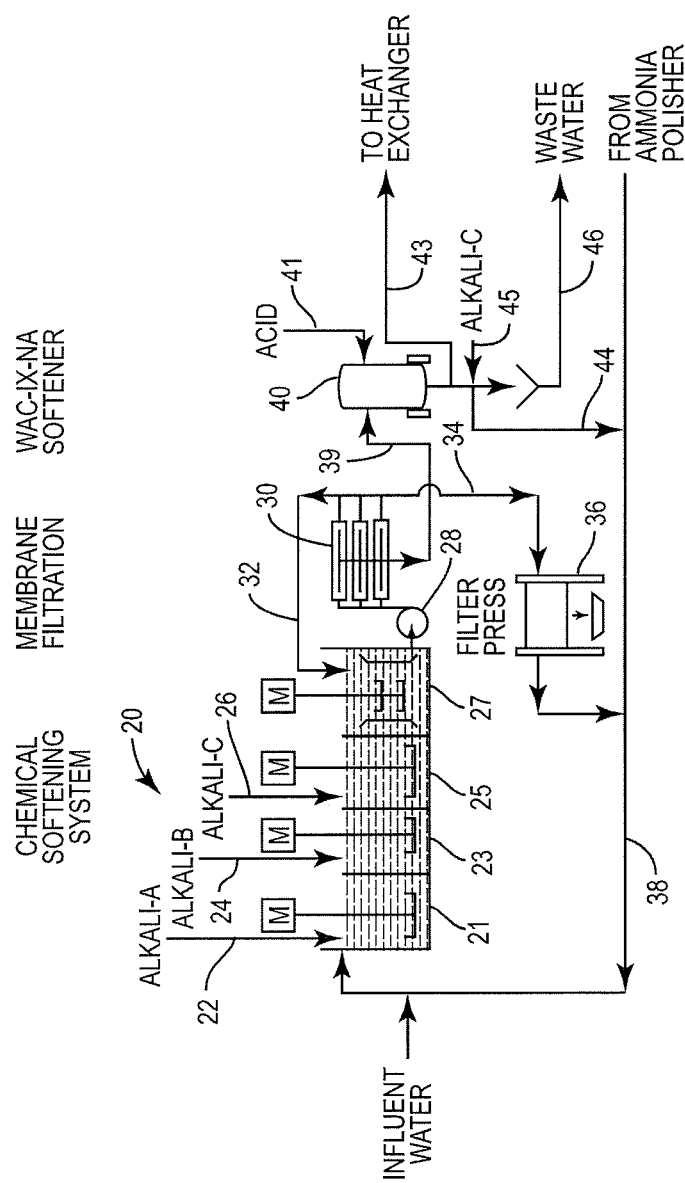
FIGS. 5A-5B are schematic illustrations of the process of the present invention including a heat exchanger and a cooling tower.
Figure 5B:
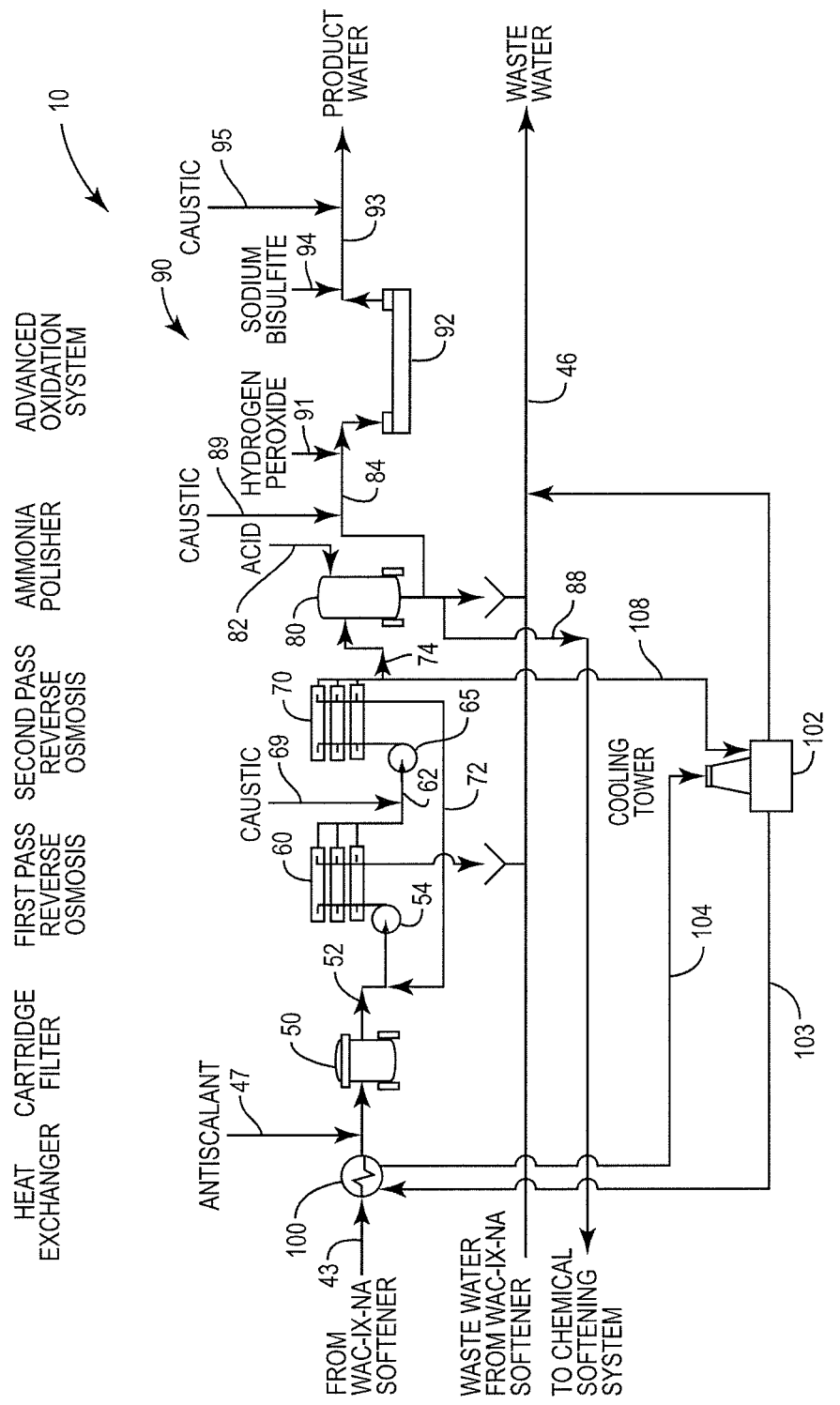

FIGS. 5A-5B illustrate an embodiment of the wastewater treatment system 10 having the chemical softening unit 20, membrane filter 30, ion exchange unit 40, first and second reverse osmosis units 60, 70, ammonia polisher 80, oxidation system 90, and heat exchanger 100. FIG. 5A illustrates the chemical softening unit 20, membrane filter 30, and ion exchange unit 40, as described above in FIG. 1. FIG. 5B illustrates the cartridge filter 50, first and second reverse osmosis units 60, 70, ammonia polisher 80, and oxidation system 90, as shown above in FIGS. 2, 3B, and 4B.

In the process depicted in FIGS. 5A-5B, there is provided a heat exchanger 100 that is disposed generally between the ion exchange unit 40 and the cartridge filter 50. The heat exchanger cools the effluent produced by the ion exchange unit 40 prior to the effluent reaching the one or more reverse osmosis units. As seen in FIG. 5B, the cooling medium or water utilized by the heat exchanger 100 is directed from the heat exchanger 100 through line 104 to a cooling tower 102. There the cooling medium or water is cooled and recirculated back to the heat exchanger 100 via return line 103. From time to time, it may be necessary to provide make-up water for use by the heat exchanger 100. Thus, make-up water is taken from the permeate of the reverse osmosis unit 70, in the FIG. 5B example, and directed through line 108 to the cooling tower 102. Further, from time to time, some of the water is removed from the cooling tower 102 and directed into the waste line 46.

Figure 6A:
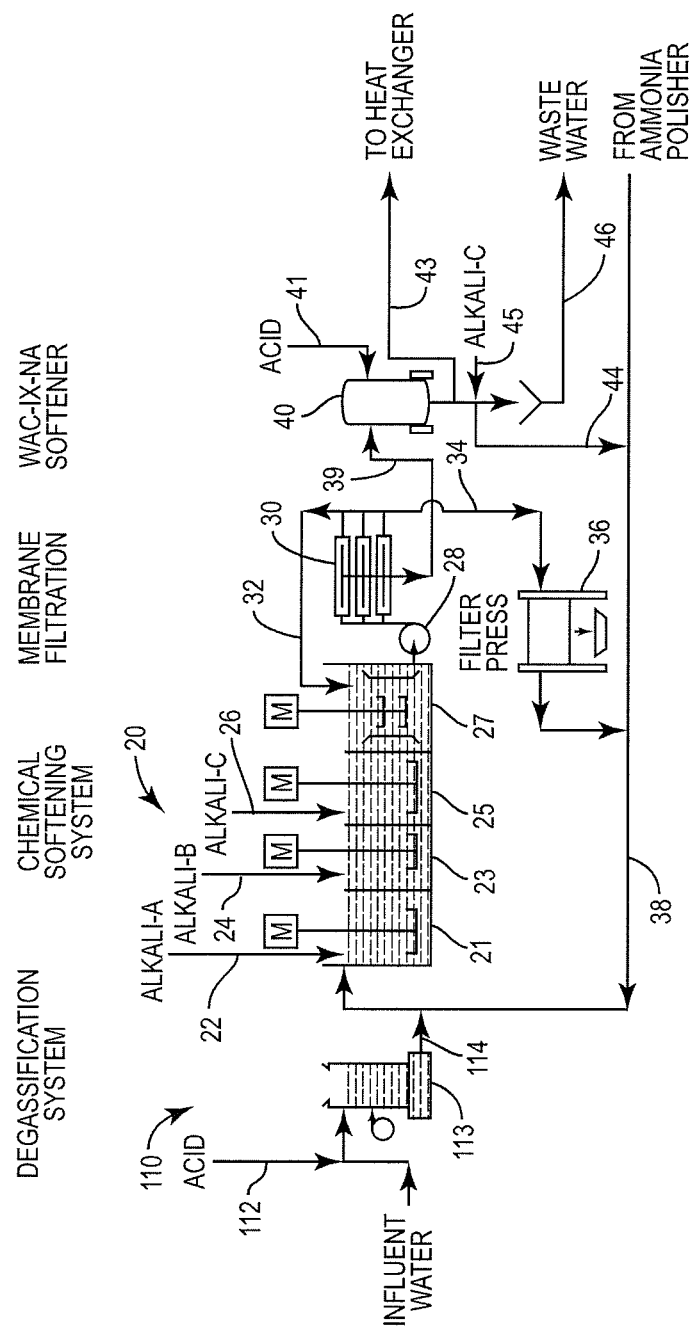
FIGS. 6A-6B are schematic illustrations of the process of the present invention including a pretreatment degasification system.
Figure 6B:
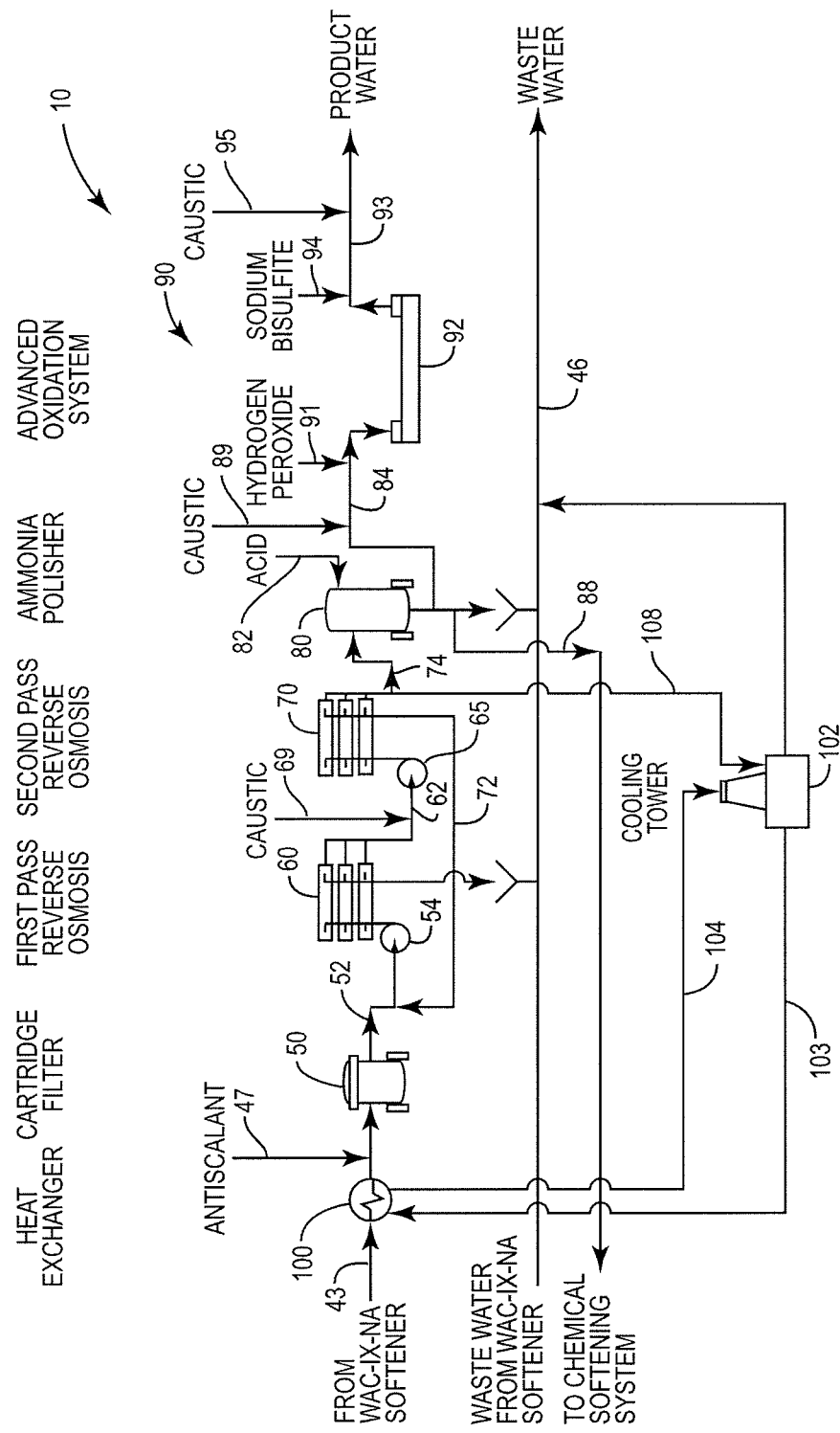

FIGS. 6A-6B illustrate an embodiment of the wastewater treatment system 10 having the chemical softening unit 20, membrane filter 30, ion exchange unit 40, first and second reverse osmosis units 60, 70, ammonia polisher 80, oxidation system 90, heat exchanger 100, and a pretreatment degasification system 110. FIG. 6A illustrates the pretreatment degasification system 110. In this embodiment, pretreatment degasification system 110 is disposed upstream from the chemical softening unit 20 and includes an acid inlet 112 and a water outlet 114. Acid inlet 112 is disposed upstream from a degasification chamber 113 and injects an acidic solution into the feed water prior to water entering the degasification chamber 113. In one embodiment the degasification chamber 113 is a forced draft degasifier chamber. The degasification system 110 further includes a water outlet 114 operatively connected to the degasification chamber 113 and to the first reactor 21 of the chemical softening unit 20.

Figure 7A:
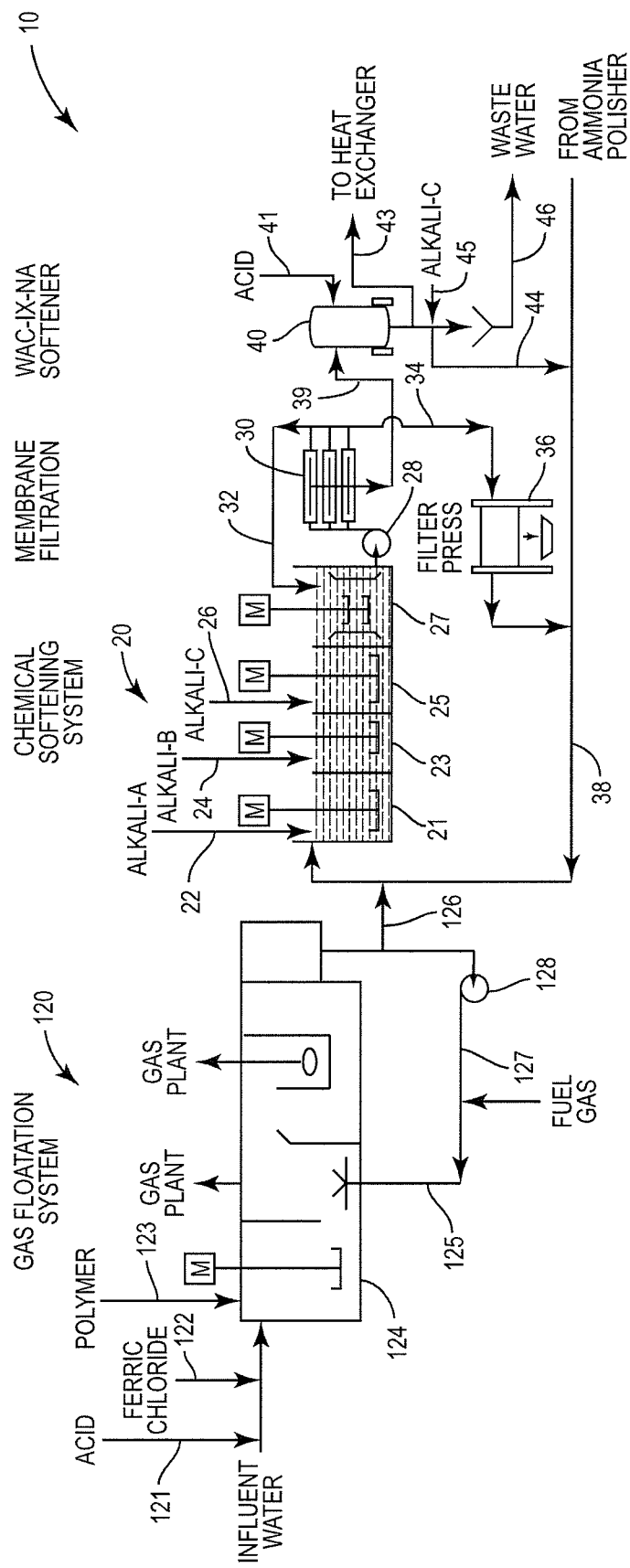
FIGS. 7A-7B are schematic illustrations of the process of the present invention including a pretreatment gas flotation system.
Figure 7B:
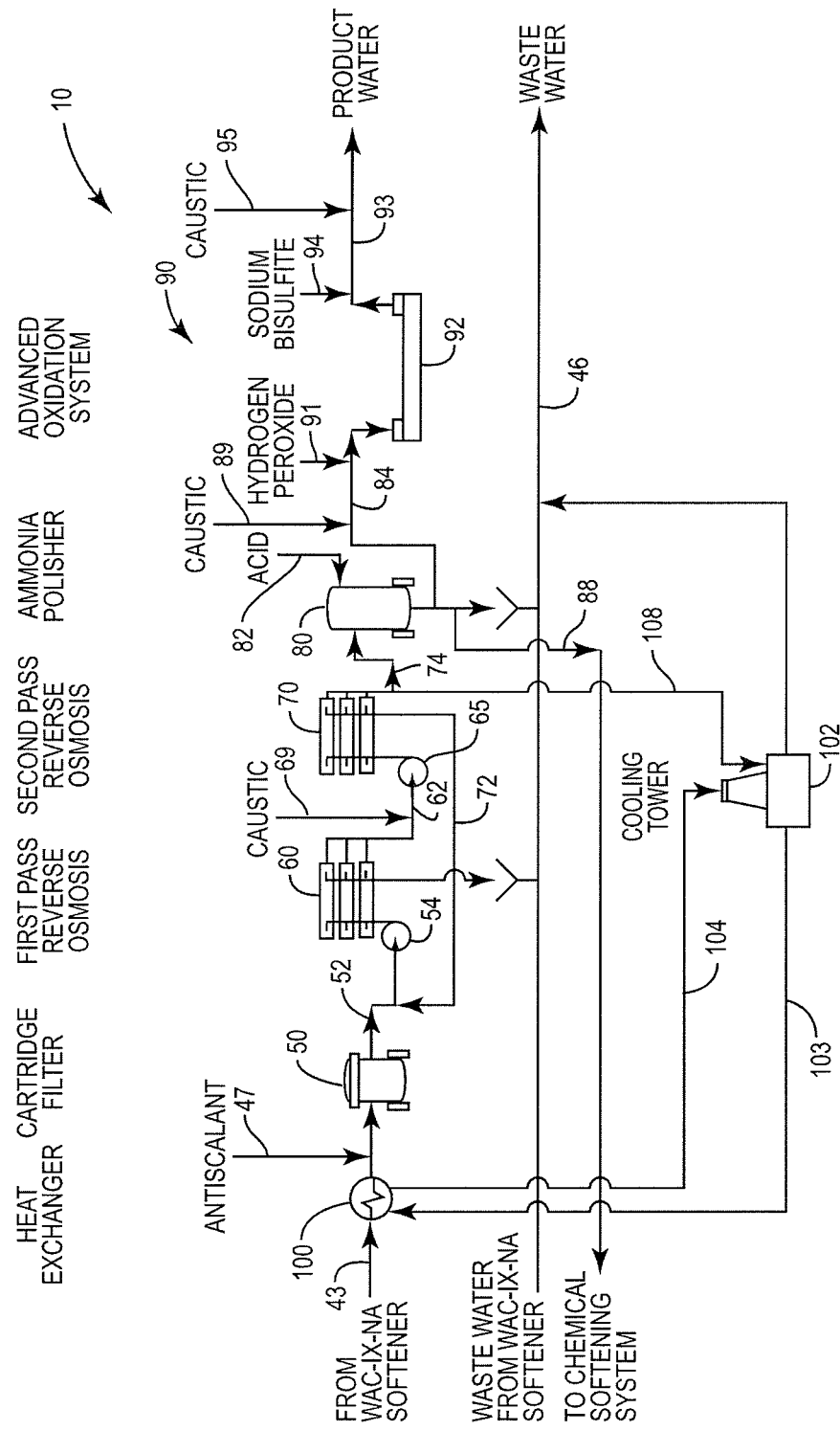

FIGS. 7A-7B illustrate an embodiment of the wastewater treatment system 10 having the chemical softening unit 20, membrane filter 30, ion exchange unit 40, first and second reverse osmosis units 60, 70, ammonia polisher 80, oxidation system 90, heat exchanger 100, and a pretreatment gas flotation system 120. FIG. 7A illustrates the pretreatment gas flotation system 120. In this embodiment, the pretreatment gas flotation system 120 is disposed upstream from the chemical softening unit 20 and includes an acid inlet 121 and a ferric chloride ($FeCl_3$) (for example) inlet 122. Acid inlet 121 and the $FeCl_3$ inlet 122 inject an acidic solution and $FeCl_3$ into the feed water or wastewater respectively prior to the water entering a gas flotation chamber 124. Gas flotation chamber 124 includes a mixer, a polymer inlet 123, and a gas inlet 125. Gas flotation system 120 further includes a water outlet 126 operatively connected to the gas flotation chamber 124 and to the first reactor 21 of the chemical softening unit 20. A recycle line 127 extends from the water outlet 126 to the gas flotation chamber 124. A pump 128 is disposed along the recycle line 127 and functions to pump water through the recycle line 127 and into the gas flotation chamber 124.

With reference to the specific processes illustrated in the figures, feed water or wastewater influent is directed to the chemical softening unit 20. The purpose of the chemical softening process is to reduce total hardness in the feed water to solubility limits, typically less than approximately 55 mg/l as $CaCO_3$. Further, the softening process carried out in the chemical softening unit 20 removes at least a portion of the silica from the feed water.

As shown in the figures, a first alkali based reactant is added to the wastewater in reactor 21 through inlet 22. In one embodiment the first alkali based reactant is calcium hydroxide ($Ca(OH)_2$). As $Ca(OH)_2$ is mixed with the wastewater, carbon dioxide ($CO_2$), calcium bicarbonate ($Ca(HCO_3)_2$), and magnesium bicarbonate ($Mg(HCO_3)_2$) dispersed throughout the wastewater react with the $Ca(OH)_2$ to precipitate some calcium carbonate ($CaCO_3$) and some magnesium hydroxide ($Mg(OH)_2$). $Ca(OH)_2$ also reacts with magnesium sulfate ($MgSO_4$) and magnesium chloride ($MgCl_2$) in the wastewater to precipitate magnesium hydroxide ($Mg(OH)_2$).

In one embodiment, magnesium oxide (MgO) is also added to the wastewater. MgO can be added to the water prior to the water entering reactor 21 or MgO can be added to the water while in reactor 21. As MgO is mixed with the water, it is converted into magnesium hydroxide ($Mg(OH)_2$) which acts as an adsorbent. $Mg(OH)_2$ in the water, created through the addition of $Ca(OH)_2$ and/or MgO, adsorbs silica dispersed throughout the water.

Wastewater is transferred from reactor 21 to reactor 23 where a second alkali based reactant is added to the water through inlet 24. In one embodiment, the second alkali based reactant is sodium carbonate ($Na_2CO_3$). As $Na_2CO_3$ is mixed with the water, the $Na_2CO_3$ reacts with calcium sulfate ($CaSO_4$) and calcium chloride ($CaCl_2$) in the water to precipitate $CaCO_3$.

The addition of these reagents, for example $Ca(OH)_2$, MgO, and $Na_2CO_3$, causes hardness compounds to precipitate from the wastewater stream being treated. After precipitation, these precipitants can be removed by filtration such as with the filtration membrane and cartridge filter.

After the wastewater is treated in the reactor 23, the wastewater is directed to reactor 25 where a third alkali based reactant can be added to the water through inlet 26. In one embodiment, the third alkali based reactant is a caustic solution, such as sodium hydroxide (NaOH). The third alkali based reactant raises the pH of the water to above 10.5. As discussed in more detail below, it is often preferable to maintain the pH of the water in the range of 10.5 to 11.5.

The above description includes the addition of several alkaline reagents and a caustic reagent. However, it is noted that the addition of each of the above reagents is merely an exemplary embodiment of the present invention. Further, the present invention encompasses embodiments in which only one or two alkaline reagents and a caustic reagent are added to the water. For example, it may be effective to add only one alkaline reagent and one caustic reagent to the water to remove hardness from the water and effectively increase the pH of the water.

After the water has been treated in reactor 23, the water is directed to the mixing reactor 27 where the wastewater is vigorous mixed in the vertical mixer. Mixing in the mixing reactor 27 causes precipitants to grow larger which makes it easier for the downstream membrane filter 30 to reject the precipitants. As discussed below, the reject stream of the membrane filter 30 is recycled via line 32 to the mixing reactor 27. The mixing action of the vertical tube mixer in reactor 27, coupled with the recycle of solids or precipitants from the membrane filter 30, gives rise to a crystallization process where the solids form crystals and the mixing action realized in the reactor 27 causes the crystals to grow larger. Note, that in mixing reactor 27, the vertical tube mixer includes a tube-like structure disposed in the reactor and one or more mixers disposed within the two structures. In mixing the various reagents and precipitants, wastewater in reactor 27 is induced into the top of the tube and caused to move downwardly through the tube and out the bottom of the tube. This continuous mixing action causes the wastewater, along with the precipitants or crystals to move back up toward the top of the reactor outside of the tube. Thereafter the wastewater re-enters the top of the tube. Thus, this continuous mixing action causes the wastewater to be drawn down through the tube, out of the tube, and up the sides of the reactor and back down through the tube. This type of mixing action promotes an efficient crystallization process where the precipitants tend to grow larger. After the crystals or precipitants have increased in size, the effluent from the mixing reactor 27 is directed to membrane filter 30 via the pump 28. Typically, the effluent from the mixing reactor 27 is directed through the membrane filter 30 at a pressure of approximately 30 psi to approximately 60 psi.

Membrane filter 30 removes suspended solids and particulates. The present wastewater treatment system and process is effective in treating produced water which typically includes free oil and even emulsified oil. See FIG. 1. The membrane filter 30 is effective to remove both free oil and emulsified oil. Removing free oil and emulsified oil with the membrane filter 30 increases the life of the downstream reverse osmosis unit(s) 60, 70. Generally, manufacturers of reverse osmosis units suggest that the reject stream of a reverse osmosis unit should have no more than 1 ppm of free oil therein. Thus, it is preferred to remove as much free oil and emulsified oil from the wastewater or produced water prior to being treated in a reverse osmosis unit. Thus, in one embodiment it is desirable for the filtrate produced by the membrane filter 30 to have a total hardness of less than 50 mg/l $CaCO_3$, a free oil concentration of less than 0.50 mg/l and a turbidity of less than 0.5. As noted above, membrane filter 30 produces a reject stream in which at least a portion thereof is directed through recycle line 32 to the mixing reactor 27 where it mixed with the wastewater in the mixing reactor 27. Another portion of the reject stream is directed to waste line 34 that directs the reject stream from the membrane filter 30 to a filter press 36. Filter press 36 removes excess water from the reject stream which is directed to recycle line 38 and directed to the chemical softening unit 20. The remaining solids recovered from the filter press 36 are directed to disposal.

Membrane filter 30 also produces a filtrate which is directed to the ion exchange unit 40 through filtrate line 39. As the filtrate passes through the ion exchange unit 40, $Ca^{2+}$ and $Mg^{2+}$ in the filtrate are removed through a cation exchange process. For example, in one embodiment, the ion exchange unit 40 includes a $Na^+$ based cation resin. The $Ca^{2+}$ and $Mg^{2+}$ in the filtrate are exchanged with the $Na^+$ in the resin. Moreover, other metal cations present in the filtrate are exchanged with the $Na^+$ in the resin. Thus, the ion exchange unit 40 further reduces the total hardness of the wastewater and reduces the concentration of other soluble metals in the water.

As the resin in the ion exchange unit 40 becomes saturated with $Ca^{2+}$ and $Mg^{2+}$, and other metal ions, the resin needs to be regenerated to maintain its effectiveness. To regenerate the resin, an acid solution added to the ion exchange unit 40 through inlet 41 is directed through the resin. A portion of the waste produced through the resin regeneration is recycled to the chemical softening unit 20 through recycle waste line 44. A caustic solution is added to the waste stream in the waste line 44 through inlet 45. This addition reduces the pH of the acidic waste stream. Another portion of the waste stream produced through resin regeneration is directed to the waste line 46 and sent for disposal.

The softened effluent from the ion exchange unit 40 is directed from the ion exchange unit 40 through line 43 to the cartridge filter 50 which removes fine particulates present in the effluent. An antiscalant is added to the effluent through inlet 47 upstream of the cartridge filter 50 to maintain a soluble chemical equilibrium for the scale forming compounds across the downstream reverse osmosis unit(s) 60, 70. In processes such as described herein, it is difficult to eliminate scaling or fouling of the membranes associated with the reverse osmosis unit(s) by chemical softening and softening in the ion exchange unit 40. For that reason, the antiscalant is added to the feed water or wastewater stream ahead of a first reverse osmosis unit 60. In another embodiment, the antiscalant inlet 47 can also be disposed downstream from the cartridge filter 50 and upstream from the reverse osmosis unit 60. The filtered water exits the cartridge filter 50 through filtered water line 52 and is directed to a first reverse osmosis unit 60 via a pump 54. To ensure that the downstream reverse osmosis units do not experience extensive fouling or scaling, in one embodiment it is desirable that the filtered water from the cartridge filter 50 have a total hardness of less than 0.20 mg/l $CaCO_3$, a free oil concentration of less than 0.50 mg/l, and a silt density index of less than 4.0.

The first reverse osmosis unit 60 reduces organics, silica, boron, and total dissolved solids present in the water. Accordingly, the first reverse osmosis unit 60 produces a reject stream having a relatively high concentration of contaminants and a treated effluent stream having a relatively low concentration of contaminants. The reject stream is directed through reject line 61 to waste line 46 for disposal. The treated effluent or permeate is directed through the treated effluent line 62 to a discharge area or to a point where the treated effluent is subjected to additional treatment. In one embodiment, it is desirable for the treated effluent or permeate for the first reverse osmosis unit 60 to have less than 1,000 μS/cm conductivity. Carbon dioxide ($CO_2$) is injected into the treated effluent in the treated effluent line 62 through inlet 63. The addition of $CO_2$ decreases the pH of the wastewater. As discussed above, the treated effluent from the reverse osmosis unit 60 has a generally high pH. When $CO_2$ is added to the water it dissolves and forms a carbonic acid, $H_2CO_3$, a generally weak acid. Thus, the addition of $CO_2$ is beneficial when the treated effluent is discharged or subjected to downstream treatment and requires a downward adjustment in pH.

Appearing below under Table 1 is a summary of exemplary data for a cooling tower blowdown feed water treated in the process described above. Note that calcium hardness is reduced in the chemical softening unit 20 from 500 ppm to 8 ppm. In addition, magnesium hardness is reduced in the chemical softening unit from 100 ppm to 2 ppm. Further, silica is reduced in the chemical softening unit from 150 ppm to 80 ppm. Again, the pH in the chemical softening process is raised to 10.7. The table below refers to free oil, emulsified oil, and soluble oil. As used herein, if an oil particle is 30 μm or greater, it is referred to as free oil. If the oil particle is between 1 and 30 μm, it is referred to as emulsified oil. If the oil particle is less than 1 μm, it is referred to as soluble oil.

It is noted that the chemical softening unit 20 does not decrease the total alkalinity in the feed water. Rather, the chemical softening unit actually increases the alkalinity in the feed water. For example, in preliminary tests and as described below, the feed water had a total alkalinity of 150 ppm as $CaCO_3$. After treatment in the chemical softening unit, the effluent had a total alkalinity of 400 ppm as $CaCO_3$. A decrease in total alkalinity only occurs after treatment in the RO system. Maintaining a high alkalinity in the water increases the rejection rate of organics in the water passing through the RO system.

TABLE 1

| | Cooling Tower Blowdown Feed Water | Chemical Softening Effluent | Ceramic Membrane Filtrate | Ion Exchange Effluent | RO System Permeate | Treated Effluent |
|---|---|---|---|---|---|---|
| pH (S.U.) | 6.5-8.5 | 10.7 | 10.7 | 10.7 | 10.2 | 7.5 |
| Total Alkalinity (ppm as $CaCO_3$) | 150 | 400 | 400 | 400 | <75 | <75 |
| Ca-Hardness (ppm as $CaCO_3$) | 500 | 8.0 | 8.0 | 0.08 | Non-detect | Non-detect |
| Mg-Hardness (ppm as $CaCO_3$) | 100 | 2.0 | 2.0 | 0.02 | Non-detect | Non-detect |
| Dissolved Silica (ppm) | 150 | 80 | 80 | 80 | <0.5 | <0.5 |
| Free Oil (ppm) | 10.0 | 10.0 | <0.2 | <0.2 | Non-detect | Non-detect |
| Emulsified Oil (ppm) | 5.0 | 5.0 | <0.2 | <0.2 | Non-detect | Non-detect |
| Soluble Oil (ppm) | 10.0 | 10.0 | 10.0 | 10.0 | <0.5 | <0.5 |
| TSS (ppm) | 30 | 1,000 | <0.2 | <0.2 | Non-detect | Non-detect |
| TDS (ppm) | 4,000 | 4,500 | 4,500 | 4,500 | 150 | 150 |
| Boron (ppm) | 5.0 | 5.0 | 5.0 | 5.0 | <0.5 | <0.5 |
| Total Organic Carbon (ppm) | 30 | 30 | 30 | 30 | <0.5 | <0.5 |

In another embodiment, shown in FIG. 2, a double pass reverse osmosis system is employed. In this embodiment, the treated effluent is directed to a second reverse osmosis unit 70 that further reduces organics, silica, boron, and total dissolved solids present in the water. When using a double pass reverse osmosis system, a pH adjustment of the treated effluent may be required between the two reverse osmosis units in order to facilitate increased rejection of the boron remaining in the water. Accordingly, a caustic solution can injected into the treated effluent through inlet 64 which is disposed downstream from the first reverse osmosis unit 60 and upstream from the second reverse osmosis unit 70. The amount of caustic injected is calculated so as to maintain the pH greater than 10.5 and preferably to a pH of 11.

Second reverse osmosis unit 70 also produces a reject stream having a relatively high concentration of contaminants and a permeate or treated effluent stream having a relatively low concentration of contaminants. The reject stream is directed through recyclable waste line 72 to the first reverse osmosis unit 60. $CO_2$ is injected into the treated effluent through inlet 76 disposed downstream from the second reverse osmosis unit 70. As mentioned above, the addition of $CO_2$ decreases the pH of the water and thus is beneficial if the treated effluent is being discharged or subjected to downstream treatment which requires a downward adjustment in pH. FIG. 2 shows that the treated effluent is directed through the treated effluent line 74 to a discharge area or to a point where the treated effluent is subjected to additional treatment. In one embodiment, it is desirable for the treated effluent or permeate from the second reverse osmosis unit 70 to have less than 75 μS/cm conductivity and a boron concentration of less than 0.83 mg/l.

The present process aims to control the pH of the wastewater passing through the one or more reverse osmosis units 60, 70 above 10.5. Maintaining a high pH of the water substantially reduces organic fouling and silica scaling of the membranes in the reverse osmosis units. Further, the solubility of organics generally increases with pH. For example, at a pH over 10 the solubility of organics is approximately 350 mg/l. However, at a pH of 6 the solubility of organics is just above 50 mg/l. The same relationship holds true for the solubility of silica. For example, the solubility of silica at a pH of about 10.5 is almost 900 mg/l. However, at a pH of 8 the solubility of silica is about 100 mg/l. By maintaining the pH of the feed water above 10.5, these particular scaling and fouling contaminants are maintained in solution and can be rejected by the one or more reverse osmosis units 60 or 70 without scaling or fouling.

The process described above can also be modified to include other processes. For example, as shown in FIG. 3, the treated effluent from the double pass reverse osmosis system is directed to the ammonia polisher 80 via treated effluent line 74. Ammonia polisher 80 includes a cation exchange resin. As the treated effluent passes through the cation exchange resin, the $H^+$ in the cation exchange resin are exchanged with $NH_4^+$ in the treated effluent. The treated effluent exiting the reverse osmosis unit 70 may, in some cases, have an ammonium hydroxide ($NH_4OH$) concentration that can be toxic to the environment if discharged. However, after $NH_4^+$ are exchanged for $H^+$ in the ammonia polisher 80, the treated water exiting the ammonia polisher 80 has a significantly smaller concentration in $NH_4OH$. In one embodiment, it is desirable for the ammonia polisher 80 to reduce the ammonia in the water to less than 0.3 mg/l as N.

As the resin in the ammonia polisher 80 becomes saturated with $NH_4^+$, the resin needs to be regenerated to maintain its effectiveness. To regenerate the resin, an acid solution is added to the ion exchange unit 40 through inlet 82. A portion waste produced through resin regeneration is recycled to the chemical softening unit 20 through recyclable waste line 88. Another portion of the waste stream produced through the resin regeneration is directed to the waste line 46 and sent for disposal. After the water is treated in the ammonia polisher 80, a caustic solution is added to the treated water in the treated water line 84 through inlet 89 disposed downstream from the ammonia polisher 80. The addition of the caustic solution is preferred if the treated water exiting the ammonia polisher 80 has a generally low pH. Typically, caustic solution is added to the treated water to increase the pH of the treated water to between approximately 6.5 and approximately 9 in order to meet environmental regulations. Then, the treated water in treated water line 84 is directed toward a discharge area or to a point where the treated water is subjected to additional treatment.

In the embodiment shown in FIGS. 4A-4B, the treated water is directed to an oxidation system 90 through the treated water line 84. A hydrogen peroxide solution is injected into the treated water through inlet 91. Treated water and the hydrogen peroxide ($H_2O_2$) solution is then directed to the ultraviolet light unit 95 where it is irradiated with ultraviolet light. Irradiation by ultraviolet light converts the $H_2O_2$ in the water into hydroxyl radicals (HO.). These radicals oxidize the organic content in the water. In one embodiment it is desirable for the oxidation system 90 to remove the carbon biological oxygen demand (CBOD) in the water to a concentration of less than 25 mg/l.

The irradiated water exits the ultraviolet light unit 92 through line 93 and is then injected with a $NaHSO_4$ solution through inlet 94. The $NaHSO_4$ solution removes residual $H_2O_2$ from the water. The irradiated water can also be injected with a caustic solution through inlet 95. The addition of a caustic solution is preferred if the irradiated water has a generally low pH. As described above, the caustic solution is added to the water to increase the pH of the water to between approximately 6.5 and approximately 9 in order to meet environmental regulations. Then, the irradiated water in line 93 is either directed toward a discharge area or to a point where the treated water is subjected to additional treatment.

In another embodiment, shown in FIGS. 5A-5B, the temperature of the treated effluent exiting the ion exchange unit 40 is cooled through the use of a heat exchanger 100 and a cooling tower 102. In typical produced water applications, the produced water influent has a temperature of approximately 160° F. to approximately 200° F. It is beneficial to cool the water prior to treatment in the reverse osmosis unit(s). Accordingly, treated effluent in line 43 is directed to the heat exchanger 100 where it is cooled to a temperature of approximately 95° F. Cooling water is directed from the cooling tower 102 to the heat exchanger 100 through line 103. Cooling water from the heat exchanger 100 is then directed back to the cooling tower 102 via line 104. A portion of the cooling water can also be directed from cooling tower 102 to the waste line 46 and sent for disposal.

Further, after the treated effluent is treated in the first and second reverse osmosis units 60, 70, a portion of the treated water from the second reverse osmosis unit 70 is directed to the cooling tower 102 through line 108. This water is used as make-up cooling water for use in the heat exchanger 100.

Appearing below under Tables 2 and 3 is a summary of exemplary data for oil field produced water treated in the process described above. Note that calcium hardness (expressed as $CaCO_3$) was reduced in the chemical softening unit 20 from 400 ppm to 8 ppm. In addition, magnesium hardness (expressed as $CaCO_3$) was reduced in the chemical softening unit from 100 ppm to 2 ppm. Further, silica was reduced in the chemical softening unit from 300 ppm to 80 ppm. The pH in the chemical softening process was raised to 10.7. Again, it is noted that the chemical softening unit does not decrease the total alkalinity in the feed water. Rather, the chemical softening unit actually increases the alkalinity in the feed water. For example, in the preliminary test described below, the feed water had a total alkalinity of 300 ppm as $CaCO_3$. After treatment in the chemical softening unit, the effluent had a total alkalinity of 400 ppm as $CaCO_3$. A decrease in total alkalinity only occurs after treatment in the RO system. Maintaining a high alkalinity in the water increases the rejection rate of organics in the water passing through the RO system.

TABLE 2

|  | Oil Field Produced Water | Chemical Softening Effluent | Ceramic Membrane Filtrate | Ion Exchange Effluent |
| --- | --- | --- | --- | --- |
| pH (S.U.) | 6.5-8.5 | 10.7 | 10.7 | 10.7 |
| Total Alkalinity (ppm as $CaCO_3$) | 300 | 400 | 400 | 400 |
| Ca-Hardness (ppm as $CaCO_3$) | 400 | 8.0 | 8.0 | 0.08 |

TABLE 2-continued

|  | Oil Field Produced Water | Chemical Softening Effluent | Ceramic Membrane Filtrate | Ion Exchange Effluent |
|---|---|---|---|---|
| Mg-Hardness (ppm as $CaCO_3$) | 100 | 2.0 | 2.0 | 0.02 |
| Dissolved Silica (ppm) | 300 | 80 | 80 | 80 |
| Free Oil (ppm) | 100.0 | 100.0 | <0.2 | <0.2 |
| Emulsified Oil (ppm) | 10.0 | 10.0 | <0.2 | <0.2 |
| Soluble Oil (ppm) | 100.0 | 100.0 | 100.0 | 100.0 |
| TSS (ppm) | 50 | 1,000 | <0.2 | <0.2 |
| TDS (ppm) | 7,000 | 7,500 | 7,500 | 7,500 |
| Boron (ppm) | 26.0 | 26.0 | 26.0 | 26.0 |
| Total Organic Carbon (ppm) | 100 | 100 | 100 | 100 |
| Total Ammonia (ppm) | 20.0 | 20.0 | 20.0 | 20.0 |

TABLE 3

|  | RO System Permeate | Ammonia Polisher Effluent | Advanced Oxidation Effluent | Treated Effluent |
|---|---|---|---|---|
| pH (S.U.) | 10.2 | 4.5 | 6.5 | 7.5 |
| Total Alkalinity (ppm as $CaCO_3$) | <75 | Non-detect | 20 | 20 |
| Ca-Hardness (ppm as $CaCO_3$) | Non-detect | Non-detect | Non-detect | Non-detect |
| Mg-Hardness (ppm as $CaCO_3$) | Non-detect | Non-detect | Non-detect | Non-detect |
| Dissolved Silica (ppm) | <0.5 | <0.5 | <0.5 | <0.5 |
| Free Oil (ppm) | Non-detect | Non-detect | Non-detect | Non-detect |
| Emulsified Oil (ppm) | Non-detect | Non-detect | Non-detect | Non-detect |
| Soluble Oil (ppm) | <0.5 | <0.5 | <0.5 | <0.5 |
| TSS (ppm) | Non-detect | Non-detect | Non-detect | Non-detect |
| TDS (ppm) | 150 | <10 | <20 | <20 |
| Boron (ppm) | <0.5 | <0.5 | <0.5 | <0.5 |
| Total Organic Carbon (ppm) | <0.5 | <0.5 | Non-detect | Non-detect |
| Total Ammonia (ppm) | 20.0 | <0.1 | <0.1 | <0.1 |

Other embodiments of the present invention include pretreatments of the feed water prior to treatment in the chemical softening unit 20. For example, in FIG. 6A, the feed water is subjected to a degassing process in a degasification system 110 prior to treatment in the chemical softening unit 20. The degasification process is particularly useful for feed waters containing volatile organic carbons and dissolved gases. In such cases, an acid is injected through inlet 112 and mixed with the feed water to partially convert the bicarbonates present in the feed water to $CO_2$ and to maintain hydrogen sulfide or other dissolved gases in a gaseous state. Gases present in the water are pulled from the system through the degasifier and scrubbed using activated carbon canisters. In one embodiment, the degasification process utilizes a force draft degasifier or $DO_x$ stripper to reduce the $CO_2$ and the hydrogen sulfide present in the feed water. Other types of degasifiers such as vacuum, membrane or depurator type degasifiers can also be used for this application. Typically, the pH is lowered to a range of 4.5 to 6.5 ahead of the degasifier and the effluent from the degasifier is typically in the pH range of 5.0-7.0. Degassed water exits the degasification system 110 through outlet 114 and is then directed to the chemical softening unit 20, where it undergoes treatment described above.

The present invention may also include a pretreatment gas flotation system 120. For example, in FIG. 7, the feed water is subjected to gas flotation prior to treatment in the chemical softening unit 20. Typically gas flotation systems are useful for removing free oil from the feed water and reducing turbidity and the organic concentration in the feed water. In one embodiment, the water is dosed with an acidic solution through acid inlet 121 and $FeCl_3$, for example, through inlet 122. Typically, the $FeCl_3$ dosage for COD removal is between 100-200 mg/l. After the feed water has been injected with an acidic solution and $FeCl_3$, the feed water is directed into gas flotation chamber 124. A polymer is then added to and mixed with the water in gas flotation chamber 124 through inlet 123. A gas, such as nitrogen ($N_2$) or methane ($CH_4$), is directed through the water in the gas flotation chamber 124 through inlet 125. The gas bubbles facilitate the removal of free oil and insoluble organic particulates, which rise to the top of the water where they are skimmed off as waste. The treated water exits the gas flotation system 120 through outlet 126. A portion of the treated water is directed to the chemical softening unit 20, where it undergoes treatment as described above. The remainder of the water exiting the gas flotation system 120 is directed through recycle line 127 back to the gas flotation chamber 124 via pump 128.

It is further noted that the present invention is not limited to the specific combination of elements described above or shown in the drawings. Rather, the present invention encompasses embodiments that do not include all of the above elements. For example, the embodiments shown in FIGS. 6 and 7 do not necessarily require the use of an ammonia polisher, an oxidation system, and/or a heat exchanger. Likewise, the embodiment shown in FIG. 5 does not necessary require the use of an ammonia polisher and/or an oxidation system.

However, each of the embodiments in the present invention includes a membrane filtration unit. As described above, the membrane filtration unit can comprise a ceramic membrane. Specific details of ceramic membranes are not dealt with herein because the details of such membranes not per se material to the present invention, and further, ceramic membranes are known in the art. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types. In some cases the ceramic membrane may be of the type that produces both a permeate stream and a reject stream. On the other hand, the ceramic membranes may be of the dead end type, which only produces a permeate stream and from time-to-time the retentate is backflushed or otherwise removed from the membrane. For example, when treating produced water, the ceramic membrane may require cleaning by back pulsing the permeate through the membrane. However, when the transmembrane pressure across the ceramic membrane reaches a substantially high pressure, such as between approximately 40 psi and 45 psi, it may be desirable to perform a "clean-in-place" of the ceramic membrane.

The structure and materials of the ceramic membranes as well as the flow characteristics of ceramic membranes varies. When ceramic membranes are used to purify produced water, the ceramic membranes are designed to withstand relatively high temperatures as it is not uncommon for the produced water being filtered by the ceramic membranes to have a temperature of approximately 90° C. or higher.

Ceramic membranes normally have an asymmetrical structure composed of at least two, mostly three, different porosity levels. Indeed, before applying the active, microporous top layer, an intermediate layer with a pore size between that of the support, and a microfiltration separation layer. The macroporous support ensures the mechanical resistance of the filter.

Ceramic membranes are often formed into an asymmetric, multi-channel element. These elements are grouped together in housings, either a single element in a housing or multiple elements in a housing, and these membrane modules can withstand high temperatures, extreme acidity or alkalinity and high operating pressures, making them suitable for many applications where polymeric cannot be used. Several membrane pore sizes are available to suit specific filtration needs covering the microfiltration, the ultrafiltration, and nanofiltration ranges from 1 micron down to 250 Dalton MWCO).

Ceramic membranes today run the gamut of materials (from alpha alumina tosilicon carbide). The most common membranes are made of Al, Si, Ti or Zr oxides, with Ti and Zr oxides being more stable than Al or Si oxides. In some less frequent cases, Sn or Hf are used as base elements. Each oxide has a different surface charge in solution. Other membranes can be composed of mixed oxides of two of the previous elements, or are established by some additional compounds present in minor concentration. Non-oxide membranes are also available such as silicon nitride or silicon carbide with silicon carbide membranes being most prevalent. Low fouling polymeric coatings for ceramic membranes are also available.

Ceramic membranes are typically operated in the cross flow filtration mode. This mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

A small fraction of feed called permeate or filtrate, separates out as purified liquid passing through the membrane. The remaining fraction of feed, called retentate or concentrate contains materials rejected by the membrane.

The separation is driven by the pressure difference across the membrane, or the trans-membrane pressure. The parallel flow of the feed stream, combined with the boundary layer turbulence created by the cross flow velocity, continually sweeps away particles and other material that would otherwise build up on the membrane surface.

The process of the present invention has many applications. The process can be used in oil field produced water treatment for surface discharge or for use in steam generating devices to generate steam for use in oil recovery. Likewise, the process can be used in gas field produced water treatment for surface discharge. In addition, the process of the present invention can be used to treat refinery wastewater for reuse with zero liquid discharge. Moreover, the process or the present invention has applications for treating cooling tower blowdown as well as FGD scrubber blowdown. Still further, the process of the present invention has applications in treating industrial wastewater, such as automotive wastewater.

The invention claimed is:

1. A method of recovering oil or gas from an oil or gas well and treating resulting produced water, comprising:
   a. recovering an oil/water or gas/water mixture from the oil or gas well;
   b. separating oil from the oil/water mixture or separating gas from the gas/water mixture to produce an oil or gas product and the produced water, and wherein the produced water includes organics, hardness, dissolved solids and suspended solids;
   c. reducing hardness in the produced water by chemically softening the produced water in a chemical softening unit which results in the formation of hardness precipitants;
   d. raising the pH of the produced water to 10.5 and above;
   e. directing the produced water having said pH of 10.5 and above to a mixing tank forming a part of the chemical softening unit and mixing the produced water in said mixing tank and causing crystallization of the precipitants within the produced water;
   f. after crystallization, removing free oil and crystals from the produced water by directing the produced water through a membrane filter and producing a membrane effluent and a membrane reject stream containing free oil and the crystals;
   g. recirculating at least a portion of the membrane reject stream to the chemical softening unit and causing the crystals in reject stream to grow larger;
   h. directing the membrane effluent to an ion exchange unit and further softening the membrane effluent by removing residual calcium and magnesium hardness therefrom and producing an ion exchange effluent and a waste stream;
   i. after further softening the membrane effluent, directing the ion exchange effluent to at least one reverse osmosis unit and removing dissolved solids from the ion exchange effluent and producing a reject stream and a permeate stream which contain ammonium hydroxide ($NH_4OH$);
   j. reducing the concentration of ammonium hydroxide in the reverse osmosis permeate stream by directing the reverse osmosis permeate stream through an ammonia polisher located downstream from the reverse osmosis unit;
   k. regenerating the ammonia polisher by adding an acid solution to the ammonia polisher which generates a waste stream produced by the ammonia polisher;
   l. directing at least a portion of the waste stream produced by the ammonia polisher to the chemical softening unit and subjecting the waste stream from the ammonia polisher to treatment in the chemical softening unit; and
   m. wherein the ammonia polisher produces a treated effluent.

2. The method of claim 1 wherein the produced water includes free oil and wherein the method includes, prior to removing hardness, directing the produced water to a treatment unit disposed upstream of the chemical softening unit for removing free oil and reducing turbidity and the concentration of organics in the produced water and including:
   mixing an acid and a coagulant with the produced water;
   after mixing the acid and the coagulant with the produced water, directing the produced water to a gas flotation chamber;
   mixing a polymer with the produced water in the gas flotation chamber;
   directing a gas through the produced water in the flotation chamber wherein gas bubbles associated with the gas to facilitate the removal of the free oil and insoluble organic particulates in the produced water as the gas bubbles rise to the top of the produced water in the gas flotation chamber and the method includes skimming the gas bubbles from the produced water; and
   directing the produced water from the gas flotation chamber and directing at least a portion of the produced water to the chemical softening unit and recycling another portion of the produced water from the gas flotation chamber back to the gas flotation chamber.

3. A method of recovering oil or gas from an oil or gas well and treating resulting produced water, comprising:
 a. recovering an oil/water or gas/water mixture from the oil or gas well;
 b. separating oil from the oil/water mixture or separating gas from the gas/water mixture to produce an oil or gas product and the produced water, and wherein the produced water includes organics, silica, hardness, dissolved solids and suspended solids;
 c. reducing hardness in the produced water by chemically softening the produced water in a chemical softening unit which results in the formation of hardness precipitants;
 d. raising the pH of the produced water to 10.5 and above;
 e. directing the produced water having said pH of 10.5 and above to a mixing tank forming a part of the chemical softening unit and mixing the produced water in said mixing tank and causing crystallization of the precipitants within the produced water;
 f. after crystallization, removing free oil and crystals from the produced water by directing the produced water through a membrane filter and producing a membrane effluent and a membrane reject stream containing free oil and the crystals;
 g. recirculating at least a portion of the membrane reject stream to the chemical softening unit and causing the crystals in reject stream to grow larger;
 h. directing the membrane effluent to an ion exchange unit and further softening the membrane effluent by removing residual calcium and magnesium hardness therefrom and producing an ion exchange effluent and a waste stream;
 i. after further softening the membrane effluent, directing the ion exchange effluent to at least one reverse osmosis unit and removing dissolved solids from the ion exchange effluent and producing a reject stream and a permeate stream which contain organics;
 j. mixing hydrogen peroxide ($H_2O_2$) with the permeate stream;
 k. after mixing hydrogen peroxide with the permeate stream, subjecting the permeate stream to ultraviolet irradiation and converting the hydrogen peroxide in the permeate stream into hydroxyl radicals (HO);
 l. employing the hydroxyl radicals to oxidize the organic content contained in the permeate stream; and
 m. after irradiating the permeate stream, mixing sodium bisulfite ($NaHSO_3$) with the permeate stream to remove residual hydrogen peroxide.

4. The method of claim 3 wherein the produced water includes free oil and wherein the method includes, prior to removing hardness, directing the produced water to a treatment unit disposed upstream of the chemical softening unit for removing free oil and reducing turbidity and the concentration of organics in the produced water and including:
 mixing an acid and a coagulant with the produced water;
 after mixing the acid and the coagulant with the produced water, directing the produced water to a gas flotation chamber;
 mixing a polymer with the produced water in the gas flotation chamber;
 directing a gas through the produced water in the flotation chamber wherein gas bubbles associated with the gas to facilitate the removal of the free oil and insoluble organic particulates in the produced water as the gas bubbles rise to the top of the produced water in the gas flotation chamber and the method includes skimming the gas bubbles from the produced water; and
 directing the produced water from the gas flotation chamber and directing at least a portion of the produced water to the chemical softening unit and recycling another portion of the produced water from the gas flotation chamber back to the gas flotation chamber.

5. The method of claim 1 wherein the membrane filter comprises a ceramic membrane and wherein the method includes removing free oil and crystals from the produced water with the ceramic membrane.

6. The method of claim 1 including cooling the ion exchange effluent by directing the ion exchange effluent through a heat exchanger and circulating a cooling medium back and forth between the heat exchanger and a cooling tower.

7. The method of claim 1 further comprising directing the produced water to a gas flotation unit and removing total organic carbon in the produced water prior to chemically softening the produced water;
 and wherein removing total organic carbon in the produced water includes adding an acid to the produced water such that carbonates and bicarbonates in the produced water are converted into $CO_2$;
 adding ferric chloride ($FeCl_3$) to the produced water to form $Fe(OH)_3$ such that carbon in the produced water is adsorbed onto the $Fe(OH)_3$;
 adding a polymer to the produced water; and
 directing gas upwardly through the produced water such that suspended solids in the produced water move upwardly towards the surface of the produced water, removing the suspended solids from the produced water.

8. The method of claim 1 further comprising directing the produced water to a degasification unit removing dissolved gases in the produced water prior to chemically softening the produced water.

9. The method of claim 1 further including mixing an anti-scalant with the produced water upstream of the reverse osmosis unit.

10. The method of claim 3 including cooling the ion exchange effluent by directing the ion exchange effluent through a heat exchanger and circulating a cooling medium back and forth between the heat exchanger and a cooling tower.

11. The method of claim 3 wherein the membrane filter comprises a ceramic membrane and wherein the method includes removing free oil and crystals from the produced water with the ceramic membrane.

12. The method of claim 3 further comprising directing the produced water to a gas flotation unit and removing total organic carbon in the produced water prior to chemically softening the produced water;
 and wherein removing total organic carbon in the produced water includes adding an acid to the produced water such that carbonates and bicarbonates in the produced water are converted into $CO_2$;
 adding ferric chloride ($FeCl_3$) to the produced water to form $Fe(OH)_3$ such that carbon in the produced water is adsorbed onto the $Fe(OH)_3$;
 adding a polymer to the produced water; and
 directing gas upwardly through the produced water such that suspended solids in the produced water move upwardly towards the surface of the produced water, removing the suspended solids from the produced water.

13. The method of claim 3 further comprising directing the produced water to a degasification unit removing dissolved gases in the produced water prior to chemically softening the produced water.

14. The method of claim 3 further including mixing an anti-scalant with the produced water upstream of the reverse osmosis unit.

* * * * *